(12) United States Patent
Stanhope (10) Patent No.: US 10,813,265 B2
(45) Date of Patent: Oct. 27, 2020

(54) SYSTEM AND METHOD FOR AUTOMATICALLY RESETTING GROUND ENGAGING TOOLS

(71) Applicant: CNH Industrial America LLC, New Holland, PA (US)

(72) Inventor: Trevor Stanhope, Palos Hills, IL (US)

(73) Assignee: CNH Industrial America LLC, New Holland, PA (US)

(*) Notice: Subject to any disclaimer, the term of this patent is extended or adjusted under 35 U.S.C. 154(b) by 110 days.

(21) Appl. No.: 16/143,586

(22) Filed: Sep. 27, 2018

(65) Prior Publication Data

US 2020/0100419 A1    Apr. 2, 2020

(51) Int. Cl.
| | |
|---|---|
| *A01B 63/111* | (2006.01) |
| *A01B 19/10* | (2006.01) |
| *A01B 69/00* | (2006.01) |

(52) U.S. Cl.
CPC ........... *A01B 63/111* (2013.01); *A01B 19/10* (2013.01); *A01B 69/007* (2013.01)

(58) Field of Classification Search
CPC ......... A01B 19/10; A01B 33/16; A01B 49/02; A01B 63/002; A01B 63/008;
(Continued)

(56) References Cited

U.S. PATENT DOCUMENTS 4,308,920 A * 1/1982 Floyd ................. A01B 19/10
                                                172/328
4,775,940 A   10/1988 Nishida et al.
(Continued)

FOREIGN PATENT DOCUMENTS

| JP | H01218503 | 8/1989 |
|---|---|---|
| JP | 02057103 A * | 2/1990 |

(Continued)

OTHER PUBLICATIONS

Google machine translation of JP 07-12246 B (original JP document published Feb. 15, 1995) (Year: 1995).*

(Continued)

*Primary Examiner* — Faris S Almatrahi
*Assistant Examiner* — David A Testardi
(74) *Attorney, Agent, or Firm* — Rebecca L. Henkel; Rickard K. DeMille (57) ABSTRACT

A control system for an agricultural implement includes a controller configured to perform the following steps in response to determining that performance of a ground engaging tool is below a threshold performance. The controller is configured to adjust a speed of the agricultural implement to an adjusted speed. The controller is configured to raise the ground engaging tool to a target raised position in response to the speed of the agricultural implement being substantially equal to a first threshold speed. The controller is configured to adjust the speed of the agricultural implement to an initial speed in response to a position of the ground engaging tool being substantially equal to the target raised position. The controller is configured to lower the ground engaging tool to a target depth in response to the speed of the agricultural implement being substantially equal to a second threshold speed.

20 Claims, 3 Drawing Sheets

(58) Field of Classification Search
CPC . A01B 63/111; A01B 63/1112; A01B 63/112; A01B 63/114; A01B 71/08; A01B 79/005; A01B 33/08; A01B 33/087; A01B 49/022; A01B 49/025; A01B 49/027
See application file for complete search history.

(56) References Cited

U.S. PATENT DOCUMENTS

| | | | |
|---|---|---|---|
| 6,704,637 B1* | 3/2004 | Hrazdera | A01B 67/00 180/170 |
| 6,804,597 B1* | 10/2004 | Posselius | A01B 79/005 701/468 |
| 8,230,771 B2 | 7/2012 | Bitter | |
| 8,406,966 B2 | 3/2013 | Schedgick et al. | |
| 8,763,713 B2 | 7/2014 | Bassett | |
| 9,051,711 B2 | 6/2015 | Sharma et al. | |
| 9,114,822 B2 | 8/2015 | Prickel et al. | |
| 9,279,882 B2 | 3/2016 | Hukkeri et al. | |
| 9,615,501 B2 | 4/2017 | Pickett et al. | |
| 9,968,025 B2 | 5/2018 | Bunderson et al. | |
| 9,986,674 B2 | 6/2018 | Sudbrink et al. | |
| 2012/0261146 A1 | 10/2012 | Bolten | |
| 2013/0103269 A1* | 4/2013 | Meyer Zu Helligen | A01B 79/005 701/50 |
| 2014/0041563 A1* | 2/2014 | Henry | A01B 79/005 111/139 |
| 2014/0196919 A1* | 7/2014 | Kowalchuk | A01B 63/002 172/2 |
| 2015/0230391 A1* | 8/2015 | Houck | A01C 7/203 701/50 |
| 2015/0296701 A1* | 10/2015 | Anderson | A01B 71/08 172/2 |
| 2015/0305241 A1* | 10/2015 | Waechter | A01F 15/08 56/10.2 R |
| 2016/0029547 A1* | 2/2016 | Casper | A01B 63/002 701/50 |
| 2016/0088787 A1* | 3/2016 | Connell | A01B 63/112 701/50 |
| 2017/0168501 A1 | 6/2017 | Ogura et al. | |
| 2017/0177002 A1 | 6/2017 | Ogura et al. | |
| 2018/0049361 A1 | 2/2018 | Zemenchik | |
| 2018/0128933 A1 | 5/2018 | Koch et al. | |
| 2018/0208058 A1* | 7/2018 | Czapka | B60K 31/00 |
| 2018/0220577 A1* | 8/2018 | Posselius | A01B 63/1112 |
| 2018/0352718 A1* | 12/2018 | Kovach | A01B 49/027 |
| 2018/0373257 A1* | 12/2018 | Runde | G05D 1/0223 |
| 2019/0124821 A1* | 5/2019 | Henry | A01B 63/16 |
| 2019/0377986 A1* | 12/2019 | Ferrari | G06K 9/628 |
| 2020/0005474 A1* | 1/2020 | Ferrari | G06K 9/4614 |
| 2020/0053942 A1* | 2/2020 | Kilby | A01B 5/04 |
| 2020/0060064 A1* | 2/2020 | Wu | F15B 20/00 |

FOREIGN PATENT DOCUMENTS

| | | |
|---|---|---|
| JP | H05304803 | 11/1993 |
| JP | 07012246 B2 * | 2/1995 |
| JP | 08187002 A * | 7/1996 |
| JP | 10262403 A * | 10/1998 |

OTHER PUBLICATIONS

Schafer et al., "Control Concepts for Tillage Systems," 1984, pp. 313-320, Soil & Tillage Research, 4, Elsevier Science Publishers B.V., Amsterdam.

John Deere Tillage Tools Feature Precise Depth Control, Delta Farm Press, Aug. 17, 2001, pp. 1-10.

Srivastava et al., "Soil Tillage," Engineering Principles of Agricultural Machines, 2006, pp. 169-230, Chapter 8, 2nd Edition, St. Joseph, Michigan.

Yahya et al., "Mapping System for Tractor-Implement Performance," Computer and Electronics in Agriculture, 2009, pp. 1-11, vol. 69, Elsevier B.V.

* cited by examiner

SYSTEM AND METHOD FOR AUTOMATICALLY RESETTING GROUND ENGAGING TOOLS

BACKGROUND

The present disclosure relates generally to a system and method for automatically resetting ground engaging tools.

Certain agricultural implements include ground engaging tools configured to interact with the soil and/or residue disposed on the surface of the soil. The residue may include plant matter from previously harvested crops, weeds (e.g., living or destroyed), other organic material, or a combination thereof. For example, a tillage implement may include tillage points and/or disc blades configured to condition the soil and/or the residue for subsequent planting or seeding operations. During tillage operations, soil, residue, debris (e.g., small rock(s), trash, portion(s) of log(s)/stump(s), etc.), or a combination thereof, may accumulate on one or more ground engaging tools. In addition, one or more ground engaging tools may move to a deflected state in response to contact with an obstruction in the field (e.g., a rock, a stump, etc.). The soil/residue/debris accumulation on the ground engaging tool and/or movement of the ground engaging tool to the deflected state may substantially reduce the performance of the ground engaging tool (e.g., the tilling effectiveness of the ground engaging tool may be substantially reduced). Accordingly, an operator may periodically inspect and perform maintenance operations on the tillage implement. For example, the operator may clean any ground engaging tools having excessive soil/residue/debris accumulation, and/or the operator may move any deflected ground engaging tools back to a working state. Unfortunately, the inspection and maintenance process may be time-consuming, thereby reducing the efficiency of tillage operations. In addition, the performance of ground engaging tool(s) having soil/residue/debris accumulation and/or ground engaging tool(s) in the deflected state may be reduced between inspection/maintenance cycles, thereby reducing the effectiveness of the tillage implement.

BRIEF DESCRIPTION

In certain embodiments, a control system for an agricultural implement includes a controller having a memory and a processor. The controller is configured to determine whether performance of a ground engaging tool of the agricultural implement is below a threshold performance, and the controller, in response to determining that the performance of the ground engaging tool is below the threshold performance, is configured to perform the following steps. First, the controller is configured to output a first signal indicative of instructions to adjust a speed of the agricultural implement from an initial speed to an adjusted speed. In addition, the controller is configured to output a second signal indicative of instructions to raise the ground engaging tool from a target depth beneath a soil surface to a target raised position in response to the speed of the agricultural implement being substantially equal to a first threshold speed. The first threshold speed is between the initial speed and the adjusted speed, exclusive of the initial speed and inclusive of the adjusted speed. Furthermore, the controller is configured to output a third signal indicative of instructions to adjust the speed of the agricultural implement from the adjusted speed to the initial speed in response to a position of the ground engaging tool being substantially equal to the target raised position. The controller is also configured to output a fourth signal indicative of instructions to lower the ground engaging tool from the target raised position to the target depth in response to the speed of the agricultural implement being substantially equal to a second threshold speed. The second threshold speed is between the adjusted speed and the initial speed, exclusive of the adjusted speed and inclusive of the initial speed.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
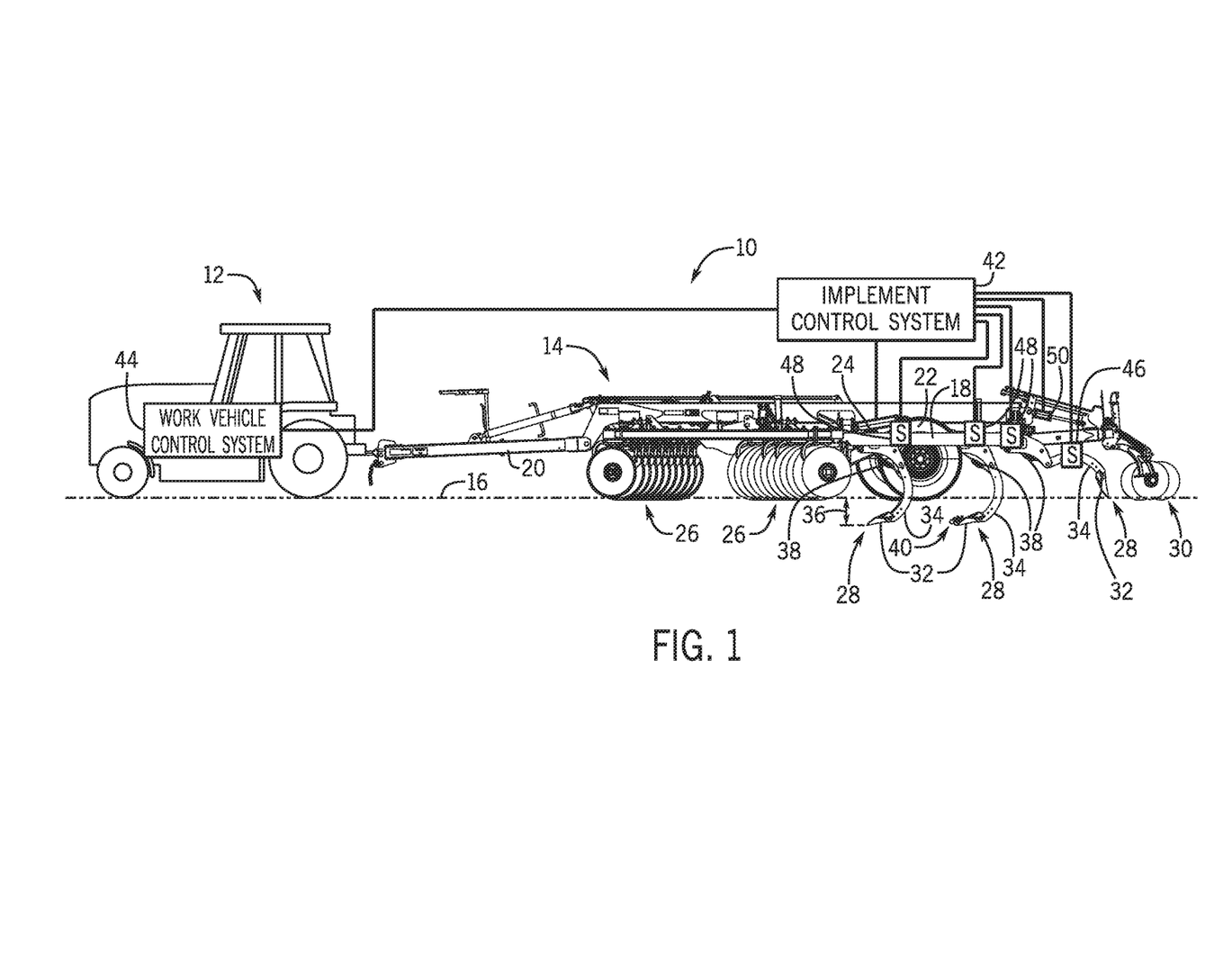
FIG. 1 is a side view of an embodiment of an agricultural system having a work vehicle and an agricultural implement.

Turning to the drawings, FIG. 1 is a side view of an embodiment of an agricultural system 10 having a work vehicle 12 and an agricultural implement 14. In the illustrated embodiment, the agricultural implement 14 is a primary tillage implement having multiple ground engaging tools configured to till soil 16. As illustrated, the agricultural implement 14 includes a frame 18 and a hitch assembly 20 coupled to the frame 18. The hitch assembly 20 is configured to couple to the work vehicle 12 (e.g., tractor or other prime mover), and the work vehicle 12 is configured to tow the agricultural implement 14 through a field. In the illustrated embodiment, the agricultural implement 14 includes wheels 22 configured to engage the surface of the soil 16 and to support at least a portion of the agricultural implement 14. In addition, the agricultural implement 14 includes an actuator 24 (e.g., cylinder) configured to move the wheels 22 from the illustrated raised position to a lowered position. While the wheels 22 are in the illustrated raised position, ground engaging tools of the agricultural implement 14 engage the soil 16. As the agricultural implement 14 is towed through the field, the ground engaging tools condition the soil and/or the residue disposed on the surface of the soil for subsequent planting or seeding operations. The actuator 24 may lower the wheels 22 from the illustrated raised position to the lowered position. As a result, the ground engaging tools are disengaged from the soil 16 to facilitate transport of the agricultural implement 14 (e.g., between successive rows of the field).

In the illustrated embodiment, the agricultural implement 14 includes disc blades 26, tillage point assemblies 28, and finishing reels 30. The disc blades 26 are configured to engage a top layer of the soil. As the agricultural implement 14 is towed through the field, the disc blades 26 are driven to rotate, thereby breaking up the top layer and sizing residue on the surface of the field. In the illustrated embodiment, the disc blades 26 are arranged in two rows. However, in alternative embodiments, the disc blades may be arranged in more or fewer rows (e.g., 1, 2, 3, 4, 5, 6, or more). In addition, the angle of each row may be selected to control the interaction of the disc blades 26 with the top layer of soil. For example, as discussed in detail below, the disc blades may be arranged in one or more gangs, and an actuator (e.g., hydraulic cylinder, linear actuator, etc.) may adjust the angle of the gang relative to the direction of travel of the implement. The tillage point assemblies 28 are configured to engage the soil at a greater depth, thereby breaking up a lower layer of the soil 16. In the illustrated embodiment, each tillage point assembly 28 includes a tillage point 32 and a shank 34. The shank 34 is configured to position the tillage point 32 at a target depth 36 beneath the soil surface, and the tillage point 32 is configured to break up the soil 16. The shape of each tillage point, the arrangement of the tillage point assemblies, and the number of tillage point assemblies may be selected to control tillage within the field. Furthermore, as the agricultural implement 14 is towed through the field, the finishing reels 30 are driven to rotate, thereby sizing soil clods, leveling the soil surface, smoothing the soil surface, destroying weeds, cutting residue on the soil surface, or a combination thereof.

In the illustrated embodiment, each tillage point assembly 28 is configured to move from a working state (e.g., in which the tillage point is positioned at the target depth) to a deflected state in response to contact with an obstruction in the field (e.g., a rock, a stump, etc.). As illustrated, a spring 38 extends between a bracket mounted to the frame 18 and the shank 34 of a respective tillage point assembly 28. The spring 38 is configured to urge the tillage point assembly 28 toward the working state. Accordingly, the spring 38 may drive the tillage point assembly 28 from the deflected state to the working state after the tillage point assembly 28 passes the obstruction. However, in certain situations (e.g., a large deflection of the tillage point assembly, the force applied by the spring is insufficient to drive the tillage point assembly from the deflected state to the working state, etc.), the tillage point assembly 28 may remain in the deflected state after passing the obstruction. For example, the rearward tillage point assembly 28 is in the deflected state with a tip of the tillage point 32 engaged with the soil surface. With the tillage implement moving through the field, the force applied by the spring 38 may not be sufficient to drive the tillage point 32 farther into the soil 16. Accordingly, the performance of the rearward tillage point assembly may be reduced. While a spring 38 is coupled to each tillage point assembly 28 in the illustrated embodiment, in other embodiments, another suitable biasing element (e.g., a pneumatic cylinder, a hydraulic cylinder, a resilient material, etc.) may be coupled to at least one tillage point assembly.

Furthermore, in the illustrated embodiment, soil, residue, debris (e.g., small rock(s), trash, portion(s) of log(s)/stump(s), etc.), or a combination thereof, may accumulate on at least one tillage point 32 and/or shank 34, thereby reducing the performance of the respective tillage point assembly 28. For example, soil/residue/debris accumulation 40 on the center tillage point 32 may effectively change the soil/residue conditioning characteristics of the tillage point, thereby reducing the effectiveness of the tillage point at breaking up the soil. The soil/residue/debris accumulation 40 may also cause the tillage point to distribute soil/residue inconsistently (e.g., irregularly creating clumps/ridges of soil/residue and/or bare spots). While a deflected tillage point assembly and soil/residue/debris accumulation on a tillage point are discussed above, the performance of the disc blades and/or the finishing reels may also be reduced due to soil/residue/debris accumulation and/or deflection. Accordingly, the illustrated agricultural implement 14 includes a control system (e.g., the illustrated implement control system 42) configured to automatically reset ground engaging tools with reduced performance (e.g., by removing soil/residue accumulation and/or by moving the ground engaging tools to the working state), thereby enhancing the performance of the agricultural implement.

In the illustrated embodiment, the implement control system 42 is communicatively coupled to a work vehicle control system 44 of the work vehicle 12 and includes the implement frame actuator 24. The implement control system 42 includes a controller configured to determine whether performance of a ground engaging tool (e.g., disc blade 26, tillage point assembly 28, finishing reel 30, etc.) is below a threshold performance. As previously discussed, the performance of the ground engaging tool may be reduced due to soil/residue/debris accumulation and/or deflection of the ground engaging tool. If the performance of the ground engaging tools is below the threshold performance, the controller is configured to automatically reset the ground engaging tool to increase performance. In certain embodiments, the controller may reset the ground engaging tool by adjusting the speed of the agricultural system and adjusting the position of the ground engaging tool. First, the controller may output a signal (e.g., to the work vehicle control system 44) indicative of instructions to adjust a speed of the agricultural system 10 from an initial speed to an adjusted speed (e.g., a slower forward speed, a speed in the rearward direction, etc.). In response to the speed of the agricultural system 10 being substantially equal to a first threshold speed, the controller may output a signal (e.g., to the frame actuator 24) indicative of instructions to raise the ground engaging tools from the target depth 36 beneath the soil surface to a target raised position (e.g., above the soil surface). As discussed in detail below, the first threshold speed may be between the initial speed and the adjusted speed, exclusive of the initial speed and inclusive of the adjusted speed. In response to a position of the ground engaging tools being substantially equal to the target raised position, the controller may output a signal (e.g., to the work vehicle control system 44) indicative of instructions to adjust the speed of the agricultural system 10 from the adjusted speed to the initial speed. Furthermore, in response to the speed of the work vehicle being substantially equal to a second threshold speed, the controller may output a signal (e.g., to the frame actuator 24) indicative of instructions to lower the ground engaging tools from the target raised position to the target depth 36. As discussed in detail below, the second threshold speed may be between the adjusted speed and the initial speed, exclusive of the adjusted speed and inclusive of the initial speed. As used herein, "substantially equal" refers to a speed differential of less than about 25 percent, less than about 20 percent, less than about 15 percent, less than about 10 percent, less than about 5 percent, less than about 2 percent, less than about 1 percent, or less than about 0.5 percent.

The target raised position may be above the soil surface, or the target raised position may be below the soil surface (e.g., slightly below the soil surface) and above the target depth. Accordingly, with the ground engaging tools in the target raised position, the resistance provided by the soil may be substantially reduced or eliminated. As such, each deflected ground engaging tool may return to the working state in response to raising the ground engaging tools to the target raised position (e.g., raising the frame 18 of the agricultural implement 14 upwardly relative to the soil surface). For example, the spring 38 may drive the rearward tillage point assembly 28 to the working state in response to raising the rearward tillage point assembly 28 to the target raised position (e.g., above the soil surface). In addition, the upward movement of the ground engaging tools through the soil and/or the downward movement of the ground engaging tools through the soil may dislodge soil/residue accumulation, thereby effectively cleaning the ground engaging tools. Accordingly, the soil/residue accumulation 40 on the center tillage point assembly 28 may be substantially removed. With the ground engaging tools reset (e.g., in the working state and/or soil/residue accumulation substantially removed), the performance of the ground engaging tools may be enhanced, thereby increasing the effectiveness of tilling operations. Furthermore, because the ground engaging tool resetting process is performed by the implement control system in response to detection of reduced ground engaging tool performance, performance of the agricultural implement may be restored more quickly than manually inspecting and cleaning the ground engaging tools at service intervals. In addition, the duration associated with resetting the ground engaging tools may be substantially reduced (e.g., as compared to manually inspecting and cleaning the ground engaging tools at service intervals).

In the illustrated embodiment, the implement control system 42 includes multiple sensors configured to facilitate determination of the ground engaging tool performance. As illustrated, the implement control system 42 includes a seedbed sensor 46 configured to output a signal indicative of a condition of the soil 16 behind the agricultural implement 14. The controller of the implement control system 42 may receive the signal and determine the performance of the ground engaging tools based on the signal. For example, if soil smoothness and/or levelness behind a particular ground engaging tool is less than a threshold soil smoothness/levelness, the controller may determine that the performance of the particular ground engaging tool is below the threshold performance. In addition, if residue distribution and/or consistency behind a particular ground engaging tool is less than a threshold residue distribution/consistency, the controller may determine that the performance of the particular ground engaging tool is below the threshold performance. Accordingly, as discussed above, the implement control system 42 may perform the resetting process to increase the performance of the particular ground engaging tool. In certain embodiments, the seedbed sensor 46 is configured to monitor the soil smoothness, the soil levelness, the residue distribution, the residue consistency, the size of residue pieces, the shape of residue pieces, the composition of the soil/residue (e.g., the depth of the residue, the mixture of soil and residue, etc.), other suitable soil/residue parameter(s), or a combination thereof. In certain embodiments, the seedbed sensor 46 may include a non-contact sensor, such as an infrared sensor, an optical sensor (e.g., camera), a radio detection and ranging (RADAR) sensor (e.g., ground-penetrating RADAR (GPR), millimeter wave (MMW) scanner, etc.), a lidar sensor (e.g., time-of-flight scanning laser, etc.), an ultrasonic sensor, an electrostatic sensor, an electromagnetic sensor, other suitable sensor type(s), or a combination thereof. In addition, in certain embodiments, the seedbed sensor may include a contact sensor, such as a penetrometer, a conductivity sensor, an electromagnetic sensor, other suitable contact sensor(s), or a combination thereof. Furthermore, while the illustrated implement control system includes a single seedbed sensor, in other embodiments, the implement control system may include more or fewer seedbed sensors (e.g., 0, 1, 2, 3, 4, 5, 6, or more).

In the illustrated embodiment, the implement control system 42 also includes position sensors 48. The position sensors 48 are configured to output a signal indicative of the position of the tillage point assemblies 28 (e.g., relative to the soil surface). For example, at least one position sensor may be configured to output a signal indicative of whether the respective tillage point assembly is in the working state (e.g., corresponding to the state of the forward and center tillage point assemblies) or in the deflected state (e.g., corresponding to the state of the rearward tillage point assembly). By way of further example, at least one position sensor may be configured to output a signal indicative of the position of the tillage point assembly, and the controller of the implement control system may be configured to determine whether the tillage point assembly is in the working state or the deflected state based on the sensor signal. In certain embodiments, the deflected state corresponds to any position of the tillage point assembly (e.g., any position of the tillage point of the tillage point assembly) that is more than a threshold distance above the working state (e.g., at which the tillage point of the tillage point assembly is positioned at the target depth). For example, the deflected state of the tillage point assembly may correspond to a position of the tillage point assembly in which the tillage point is more than about 1 cm, more than about 2 cm, more than about 3 cm, more than about 5 cm, or more than about 10 cm above the target depth 36. The controller may receive the signal output by the position sensor and determine the performance based on the position of the tillage point assembly. For example, the controller may determine that the performance of the rearward tillage point assembly is below the threshold performance because the rearward tillage point assembly is in the deflected state.

Each position sensor may be any suitable type of sensor configured to output a signal indicative of the position (e.g., state) of the respective tillage point assembly (e.g., a contact switch, a proximity sensor, an ultrasonic sensor, a potentiometer, an infrared sensor, another suitable type of sensor, or a combination thereof). In certain embodiments, a position sensor may be configured to monitor the position of a single respective tillage point assembly. However, in other embodiments, a position sensor may be configured to monitor the position of multiple tillage point assemblies (e.g., an optical sensor, etc.). In addition, the position sensor may include a pressure sensor configured to monitor hydraulic or pneumatic pressure of a cylinder configured to urge the tillage point assembly toward the working state. The controller may be configured to determine the position of the tillage point assembly based on the pressure within the cylinder. Furthermore, while the position sensors are configured to monitor the position of the tillage point assemblies in the illustrated embodiment, in other embodiments, the position sensors may be configured to monitor the position of other ground engaging tools (e.g., the disc blades, the finishing reels, etc.). While the implement control system includes three position sensors in the illustrated embodiment, in other embodiments, the implement control system may include more or fewer position sensors (e.g., 0, 1, 2, 3, 4, 5, 6, 7, 8, 9, 10, or more).

In the illustrated embodiment, the implement control system 42 includes a finishing reel actuator 50 configured to control a position of the finishing reels 30 relative to the soil surface and/or the downforce applied by the finishing reels 30 to the soil surface. In certain embodiments, the controller of the implement control system 42 is configured to output a signal to the finishing reel actuator 50 indicative of instructions to actuate the finishing reels 30 in response to the position of the finishing reels 30 being substantially equal to the target raised position (e.g., above the soil surface). For example, the controller of the implement control system 42 may instruct the actuator 50 to shake the finishing reels 30 (e.g., move the finishing reels 30 in an upward/downward pattern), thereby agitating the finishing reels 30. The agitation may dislodge soil/residue accumulation on the finishing reels 30.

In certain embodiments, the disc blades are arranged in one or more gangs. In such embodiments, the implement control system 42 may include a gang actuator configured to control an angle of the disc blade gang relative to the direction of travel of the agricultural implement. The controller of the agricultural implement control system 42 may be configured to output a signal to the gang actuator indicative of instructions to adjust the gang angle of the gang of disc blades 26 in response to the position of the disc blades 26 being substantially equal to the target raised position (e.g., above the soil surface). For example, the controller of the agricultural implement control system 42 may instruct the gang actuator to shake the gang in a forward/rearward pattern, thereby agitating the disc blades 26. The agitation may dislodge soil/residue accumulation on the disc blades 26.

In certain embodiments, one or more ground engaging tools may be mounted on at least one wing of the agricultural implement frame 18. In such embodiments, the implement control system 42 may include a wing actuator configured to rotate the wing between a working state and a transport state. The controller of the implement control system 42 may be configured to output a signal to the wing actuator indicative of instructions to move the wing in response to the position of the ground engaging tools mounted on the wing being substantially equal to the target raised position (e.g., above the soil surface). For example, the controller of the implement control system 42 may instruct the wing actuator to rock the wing in an upward/downward pattern, thereby agitating the ground engaging tools. The agitation may dislodge soil/residue accumulation on the ground engaging tools. In addition, the agitation may enable the spring(s) to drive certain ground engaging tool(s) (e.g., the tillage point assemblies) from the deflected state to the working state.

While the illustrated agricultural implement includes the disc blades 26, the tillage point assemblies 28, and the finishing reels 30, in other embodiments, the agricultural implement may include other and/or additional ground engaging tools (e.g., leveling discs configured to size clods and/or smooth the field surface, etc.). Furthermore, while the agricultural implement is towed by a work vehicle in the illustrated embodiment, in other embodiments, the agricultural implement may be self-propelled. In such embodiments, the implement control system may output the signals indicative of speed adjustments to a speed control system of the self-propelled agricultural implement. In addition, while the implement control system described herein is used to reset the grounding engaging tools of a tillage implement, in other embodiments, the implement control system may be utilized to reset ground engaging tools of other suitable implements (e.g., a planting implement, a seeding implement, a harvesting implement, etc.).

Figure 2:
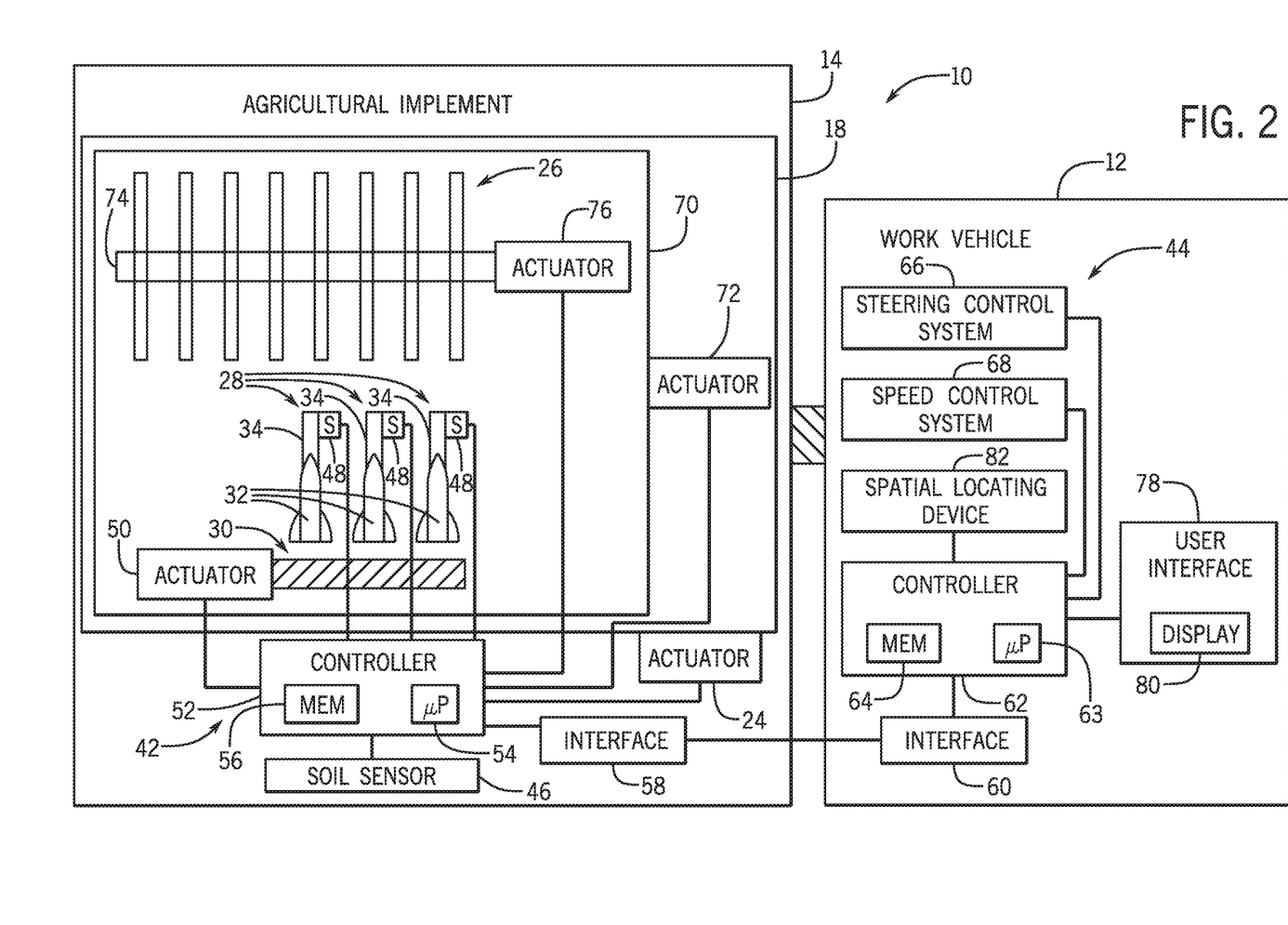
FIG. 2 is a block diagram of an embodiment of an agricultural system having a work vehicle and an agricultural implement.

FIG. 2 is a block diagram of an embodiment of an agricultural system 10 having the work vehicle 12 and the agricultural implement 14. In the illustrated embodiment, the agricultural implement 14 includes the disc openers 26, the tillage point assemblies 28, and a finishing reel 30. The agricultural implement 14 also includes the implement control system 42 configured to automatically reset ground engaging tools with reduced performance (e.g., by removing soil/residue accumulation and/or by moving the ground engaging tools to the working state), thereby enhancing the performance of the agricultural implement. In the illustrated embodiment, the implement control system 42 includes a controller 52 communicatively coupled to the implement frame actuator 24, the finishing reel actuator 50, the seedbed sensor 46, and the position sensors 48.

In certain embodiments, the controller 52 is an electronic controller having electrical circuitry configured to process data from the seedbed sensor 46 and the position sensors 48 and to output instructions to the work vehicle control system 44 and one or more actuators of the implement control system 42. In the illustrated embodiment, the controller 52 includes a processor, such as the illustrated microprocessor 54, and a memory device 56. The controller 52 may also include one or more storage devices and/or other suitable components. The processor 54 may be used to execute software, such as software for controlling one or more actuators of the implement control system 42, software for controlling the work vehicle control system 44, and so forth. Moreover, the processor 54 may include multiple microprocessors, one or more "general-purpose" microprocessors, one or more special-purpose microprocessors, one or more application specific integrated circuits (ASICS), and/or one or more field-programmable gate arrays (FPGA), or some combination thereof. For example, the processor 54 may include one or more reduced instruction set (RISC) processors.

The memory device 56 may include a volatile memory, such as random access memory (RAM), and/or a nonvolatile memory, such as read-only memory (ROM). The memory device 56 may store a variety of information and may be used for various purposes. For example, the memory device 56 may store processor-executable instructions (e.g., firmware or software) for the processor 54 to execute, such as instructions for controlling one or more actuators of the implement control system 42, instructions for controlling the work vehicle control system 44, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., threshold performance values, etc.), instructions (e.g., software or firmware for controlling the actuators, etc.), and any other suitable data.

As previously discussed, the controller 52 is configured to determine whether the performance of certain ground engaging tool(s) is below a threshold performance (e.g., stored within the memory 56 of the controller 52). In certain embodiments, the controller 52 may determine whether the performance of a ground engaging tool is below the threshold performance based on feedback from the seedbed sensor 46. For example, if soil smoothness and/or levelness behind the ground engaging tool is less than a threshold soil smoothness/levelness, and/or if residue distribution and/or consistency behind the ground engaging tool is less than a threshold residue distribution/consistency, the controller may determine that the performance of the ground engaging tool is below the threshold performance. In addition, the controller 52 may determine whether the performance of the ground engaging tool is below the threshold performance based on feedback from a respective ground engaging tool position sensor 48. For example, the position sensor 48 may be configured to output a signal (e.g., sensor signal) indicative of whether the ground engaging tool (e.g., tillage point assembly) is in the working state or is in the deflected state. The controller 52, in turn, may receive the signal and determine the performance based on the position of the ground engaging tool (e.g., tillage point assembly). In certain embodiments, the controller 52 may determine the performance (e.g., whether the performance is below the threshold performance) based on feedback from the seedbed sensor 46, the position sensor 48, or a combination of the seedbed sensor 46 and the position sensor 48. In further embodiments, the controller may utilize feedback from another suitable sensor (e.g., an optical sensor mounted to another vehicle, etc.), either alone or in combination with the seedbed sensor and/or the position sensor.

In response to determining that the performance of the ground engaging tool is below the threshold performance, the controller 52 is configured to output a signal (e.g., first signal) indicative of instructions to adjust a speed of the agricultural system 10 (e.g., the work vehicle 12 and the agricultural implement 14) from an initial speed to an adjusted speed. In the illustrated embodiment, the controller 52 is configured to output the speed control signal to the work vehicle control system 44 via an interface 58. As illustrated, the interface 58 is communicatively coupled to the controller 52 and to a corresponding interface 60 of the work vehicle control system 44. The interface 60 of the work vehicle control system 44, in turn, is communicatively coupled to a controller 62 of the work vehicle control system 44. The interfaces may be communicatively coupled to one another by any suitable connection, such as a wireless connection or a wired connection. In addition, the interfaces may communicate with one another using any suitable communication protocol, such as a standard communication protocol (e.g., CAN bus, ISOBUS, etc.) or a proprietary protocol.

In certain embodiments, the controller 62 is an electronic controller having electrical circuitry configured to process data from the interface 60 and to output instructions to other components of the work vehicle control system 44. In the illustrated embodiment, the controller 62 includes a processor, such as the illustrated microprocessor 63, and a memory device 64. The controller 62 may also include one or more storage devices and/or other suitable components. The processor 63 may be used to execute software, such as software for controlling one or more components of the work vehicle control system 44, and so forth. Moreover, the processor 63 may include multiple microprocessors, one or more "general-purpose" microprocessors, one or more special-purpose microprocessors, and/or one or more application specific integrated circuits (ASICS), or some combination thereof. For example, the processor 63 may include one or more reduced instruction set (RISC) processors.

The memory device 64 may include a volatile memory, such as random access memory (RAM), and/or a nonvolatile memory, such as read-only memory (ROM). The memory device 64 may store a variety of information and may be used for various purposes. For example, the memory device 64 may store processor-executable instructions (e.g., firmware or software) for the processor 63 to execute, such as instructions for controlling one or more components of the work vehicle control system 44, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the work vehicle control system components, etc.), and any other suitable data.

In the illustrated embodiment, the work vehicle control system 44 includes a steering control system 66 and a speed control system 68. As illustrated, the steering control system 66 and the speed control system 68 are communicatively coupled to the controller 62. In certain embodiments, the steering control system 66 may include a wheel angle control system, a differential braking system, a differential wheel speed system, or a combination thereof. The wheel angle control system may automatically rotate one or more wheels and/or tracks of the work vehicle (e.g., via hydraulic actuators) to steer the work vehicle along a target route (e.g., along guidance swaths, along turns between guidance swaths, etc.). By way of example, the wheel angle control system may rotate front wheels/tracks, rear wheels/tracks, intermediate wheels/tracks, or a combination thereof, of the work vehicle (e.g., either individually or in groups). In certain embodiments, the work vehicle includes a front portion having front wheel/tracks and a rear portion having rear wheels/tracks, in which the front and rear portions of the work vehicle are coupled to one another by a pivot joint, thereby forming an articulated work vehicle. In such embodiments, the wheel angle control system may rotate the rear portion of the work vehicle relative to the front portion to steer the work vehicle along the target route. The differential braking system may independently vary the braking force on each lateral side of the work vehicle to direct the work vehicle along a path. In addition, the differential wheel speed system may independently control the speed of wheel(s) and/or track(s) on each lateral side of the work vehicle, thereby directing the work vehicle along a path. For example, if the work vehicle includes one track on each lateral side of the work vehicle, the differential wheel speed system may control the direction of the work vehicle by adjusting the speed of each track. In addition, if the work vehicle includes at least one driven wheel on each lateral side of the work vehicle (e.g., a front driven wheel and a rear non-driven wheel, such as a caster wheel), the differential wheel speed system may control the direction of the work vehicle by adjusting the speed of each driven wheel. In further embodiments, the steering control system may include other and/or additional systems to facilitate directing the work vehicle along a path through the field.

In certain embodiments, the speed control system 68 may include an engine output control system, a transmission control system, a braking control system, or a combination thereof. The engine output control system may vary the output of the engine to control the speed of the work vehicle.

For example, the engine output control system may vary a throttle setting of the engine, a fuel/air mixture of the engine, a timing of the engine, other suitable engine parameters to control engine output, or a combination thereof. In addition, the transmission control system may adjust a gear ratio of a transmission (e.g., by adjusting gear selection in a transmission with discrete gears, by controlling a continuously variable transmission (CVT), etc.) to control the speed of the work vehicle. Furthermore, the braking control system may adjust braking force, thereby controlling the speed of the work vehicle. In further embodiments, the speed control system may include other and/or additional systems to facilitate adjusting the speed of the work vehicle.

As previously discussed, the agricultural implement controller 52 is configured to output a signal indicative of instructions to adjust the speed of the work vehicle 12 from an initial speed to an adjusted speed in response to determining that the performance of the ground engaging tool(s) is below the threshold performance. The signal is received by the work vehicle controller 62 via the agricultural implement interface 58 and the work vehicle interface 60, and the work vehicle controller 62, in turn, instructs the speed control system 68 to adjust the speed of the work vehicle 12. For example, the speed control system 68 may adjust the speed of the work vehicle by controlling the engine output control system, the transmission control system, the braking control system, or a combination thereof. In certain embodiments, the initial speed may correspond to a target speed of the agricultural system (e.g., a speed configured to till the field effectively while reducing fuel usage). The adjusted speed may be lower than the initial speed, thereby facilitating removal of the ground engaging tool(s) from the soil. In certain embodiments, the adjusted speed may be in the opposite direction of the initial speed. For example, the agricultural implement controller 52 may output a signal indicative of instructions to move the agricultural system in a direction opposite the direction of travel (e.g., the direction of the implement through the agricultural field during tillage operations). The rearward movement may drive ground engaging tool(s) from the deflected state to the working state, thereby resetting the ground engaging tool(s). In addition, the rearward movement of the agricultural system may facilitate removal of soil/residue accumulation on the ground engaging tool(s). Furthermore, the rearward movement of the agricultural system may drive the ground engaging tool(s) through a portion of the field that experienced reduced tillage effectiveness due to the performance of the ground engaging tool(s) being below the threshold performance. As a result, the portion of the field may be reworked, thereby increasing the tillage effectiveness within the portion. While an adjusted speed lower than the initial speed and an adjusted speed in the opposite direction of the initial speed are discussed above, in other embodiments, the adjusted speed may be greater than the initial speed.

In response to the speed of the agricultural system being substantially equal to a first threshold speed, the agricultural implement controller 52 may output a signal (e.g., second signal) indicative of instructions to raise the ground engaging tools from the target depth to a target raised position. In certain embodiments, the first threshold speed is between the initial speed and the adjusted speed, exclusive of the initial speed and inclusive of the adjusted speed. For example, if the adjusted speed is lower than the initial speed, the first threshold speed may be less than the initial speed and greater than or equal to the adjusted speed. By way of further example, if the adjusted speed is in the opposite direction of the initial speed, the first threshold speed may be in the direction of the adjusted speed and slower than or equal to the adjusted speed, or in the direction of the initial speed and slower than the initial speed.

In certain embodiments, in response to the speed of the agricultural system being substantially equal to the first threshold speed, the agricultural implement controller 52 may instruct the frame actuator 24 to raise the implement frame 18 relative to the soil surface (e.g., by lowering the wheels), thereby raising the ground engaging tools. In certain embodiments, the frame actuator 24 includes a hydraulic cylinder, and the agricultural implement controller 52 is configured to instruct the frame actuator 24 to raise the ground engaging tools by providing instructions to a valve assembly configured to control hydraulic fluid flow to the hydraulic cylinder. Upward movement of the ground engaging tools relative to the soil surface may dislodge soil/residue accumulation. In addition, the upward movement may drive certain ground engaging tool(s) from the deflected state to the working state, and/or the upward movement may enable the spring(s) to drive certain ground engaging tool(s) from the deflected state to the working state. Furthermore, in certain embodiments, the agricultural implement controller 52 may instruct the actuator 24 to shake the frame 18 (e.g., move the frame 18 in an upward/downward pattern), thereby agitating the ground engaging tools. The agitation may dislodge soil/residue accumulation on one or more ground engaging tools. In addition, the agitation may cause certain ground engaging tool(s) to move from the deflected state to the working state.

In certain embodiments, one or more ground engaging tool(s) are mounted on a wing 70 (e.g., a left wing, a right wing, etc.) of the implement frame 18. For example, the frame 18 of the agricultural implement 14 may include a center section having one or more ground engaging tools, a left wing having one or more ground engaging tools, and a right wing having one or more ground engaging tools. Each wing may be configured to rotate (e.g., about a longitudinal axis) relative to the center section, thereby enabling the agricultural implement to transition between a working configuration, in which the wings folded downwardly, and a transport configuration, in which the wings are folded upwardly. The implement frame may include any suitable number of wings (e.g., 0, 1, 2, 3, 4, 5, 6, or more). In the illustrated embodiment, the disc blades 26, the tillage point assemblies 28, and a finishing reel 30 are mounted to the wing 70. However, in other embodiments, one or more of the ground engaging tools may be mounted to another portion of the agricultural implement, and/or the illustrated wing may support other ground engaging tool(s).

In the illustrated embodiment, the wing 70 is driven to rotate between the working state and transport state via an actuator 72 (e.g., hydraulic cylinder, hydraulic motor, linear actuator, etc.). As illustrated, the wing actuator 72 is communicatively coupled to the agricultural implement controller 52 (e.g., via a valve assembly), thereby enabling the agricultural implement controller 52 to control the position of the wing 70. In certain embodiments, the agricultural implement controller 52 is configured to output a signal (e.g., fifth signal) to the wing actuator 72 indicative of instructions to move the wing 70 in response to the position of the ground engaging tools mounted on the wing being substantially equal to a target raised position (e.g., in response to the frame 18 being raised by the frame actuator 24). For example, the agricultural implement controller 52 may instruct the actuator 72 to rock the wing 70 (e.g., move the wing 70 in an upward/downward pattern), thereby agitating the ground engaging tools. The agitation may dislodge soil/residue accumulation on one or more ground engaging tools. In addition, the agitation may enable the spring(s) to drive certain ground engaging tool(s) from the deflected state to the working state.

In the illustrated embodiment, the implement control system 42 includes the finishing reel actuator 50 coupled to the finishing reel 30 and communicatively coupled to the agricultural implement controller 52 (e.g., via a valve assembly). As previously discussed, the finishing reel actuator 50 is configured to control a position of the finishing reel 30 relative to the soil surface and/or the downforce applied by the finishing reel 30 to the soil surface. In certain embodiments, the agricultural implement controller 52 is configured to output a signal (e.g., seventh signal) to the finishing reel actuator 50 indicative of instructions to actuate the finishing reel 30 in response to the position of the finishing reel 30 being substantially equal to the target raised position (e.g., in response to the frame 18 being raised by the frame actuator 24). For example, the agricultural implement controller 52 may instruct the actuator 50 to shake the finishing reel 30 (e.g., move the finishing reel 30 in an upward/downward pattern), thereby agitating the finishing reel 30. The agitation may dislodge soil/residue accumulation on the finishing reel 30. While a single finishing reel 30 is coupled to the finishing reel actuator 50 in the illustrated embodiment, in other embodiments, multiple finishing reels may be coupled to the finishing reel actuator. In addition, in certain embodiments, the implement control system may include multiple finishing reels actuator (e.g., each actuating one or more finishing reels). Furthermore, in certain embodiments, an actuator may be configured to move other ground engaging tool(s) relative to the implement frame. For example, an actuator may be configured to move one or more tillage point assemblies relative to the implement frame (e.g., to agitate the one or more tillage point assemblies while the position of the one or more tillage point assemblies is substantially equal to the target raised position).

In the illustrated embodiment, the disc blades 26 are arranged in a gang and configured to rotate about a common shaft 74. While the illustrated agricultural implement 14 includes a single gang of disc blades 26, in other embodiments, the agricultural implement may include more or fewer gangs (e.g., 0, 1, 2, 3, 4, 5, 6, or more). For example, in certain embodiments, the agricultural implement may include a front gang of disc blades and a rear gang of disc blades. In the illustrated embodiment, the implement control system 42 includes a gang actuator 76 configured to control an angle of the disc blade gang relative to the direction of travel of the agricultural implement. The gang actuator 76 may include a hydraulic cylinder, a hydraulic motor, a linear actuator, another suitable type of actuator, or a combination thereof. As illustrated, the gang actuator 76 is communicatively coupled to the agricultural implement controller 52 (e.g., via a valve assembly). The agricultural implement controller 52 may be configured to instruct the gang actuator 76 to adjust the gang angle (e.g., based on soil conditions, based on a target degree of tillage, based on the type of crops to be planted in the field, etc.). In addition, the agricultural implement controller may be configured to output a signal (e.g., sixth signal) to the gang actuator 76 indicative of instructions to adjust the gang angle of the gang of disc blades 26 in response to the position of the disc blades 26 being substantially equal to the target raised position (e.g., in response to the frame 18 being raised by the frame actuator 24). For example, the agricultural implement controller 52 may instruct the actuator 76 to shake the gang (e.g., rotate the gang in a forward/rearward pattern), thereby agitating the disc blades 26. The agitation may dislodge soil/residue accumulation on the disc blades 26. While a single gang of disc blades 26 is coupled to the gang actuator 76 in the illustrated embodiment, in other embodiments, multiple disc blade gangs may be coupled to the gang actuator. In addition, in certain embodiments, the implement control system may include multiple gang actuator (e.g., each actuating one or more disc blade gangs). Furthermore, in certain embodiments, an actuator may be configured to move a gang of other ground engaging tools relative to the implement frame. For example, an actuator may be configured to move a gang of tillage point assemblies relative to the implement frame.

While the agricultural implement controller 52 is configured to provide instructions to the frame actuator 24, the wing actuator 72, the finishing reel actuator 50, and the gang actuator 76 to agitate the ground engaging tools in the illustrated embodiment, in other embodiments, the agricultural implement controller 52 may provide instructions to a portion of the actuators to agitate the ground engaging tools. Furthermore, in certain embodiments, one or more of the actuators may be omitted (e.g., in embodiments with fixed gang angles, in embodiments in which the frame does not include a wing, etc.). In addition, the agricultural implement control system may include other and/or additional actuators to control the ground engaging tool(s). For example, in certain embodiments, the penetration depth of each ground engaging tool or each group of ground engaging tools may be controlled by a respective actuator (e.g., instead of or in addition to the frame actuator). In such embodiments, the agricultural implement controller may instruct the respective actuators to raise the ground engaging tools above the soil surface and lower the ground engaging tools into the soil during the ground engaging tool resetting process. In addition, the agricultural implement controller may instruct the respective actuators to agitate the respective ground engaging tools. Furthermore, in certain embodiments, the agricultural implement controller may control other elements to agitate the ground engaging tools. For example, in certain embodiments, one or more ground engaging tools may be driven by a PTO shaft. In such embodiments, the implement controller may instruct a PTO transmission of the work vehicle (e.g., via the interfaces and the work vehicle controller) to drive the ground engaging tools in opposite directions in an alternating pattern, thereby agitating the ground engaging tool(s). In further embodiments, the implement controller may instruct an electrohydraulic remote valve of the work vehicle (e.g., via the interfaces and the work vehicle controller) to alternating change the direction of fluid flow to an actuator on the agricultural implement, thereby causing the actuator to agitate certain ground engaging tool(s).

In response to the position of the ground engaging tools being substantially equal to the target raised position (e.g., above the soil surface), and completion of the agitation process in embodiments in which the ground engaging tools are agitated, the agricultural implement controller 52 may output a signal (e.g., third signal) indicative of instructions to adjust the speed of the agricultural system 10 to the initial speed. For example, the agricultural implement controller 52 may output a signal indicative of the speed to the work vehicle controller 62 (e.g., via the agricultural implement interface 58 and the work vehicle interface 60), and the work vehicle controller 62, in turn, may output a signal indicative of the speed to the speed control system 68. In response to the speed of the agricultural implement system being substantially equal to a second threshold speed, the agricultural implement controller 52 may output a signal (e.g., fourth signal) to the frame actuator 24 indicative of instructions to lower the ground engaging tool(s) from the target raised position to the target depth. In certain embodiments, the second threshold speed is between the adjusted speed and the initial speed, exclusive of the adjusted speed and inclusive of the initial speed. For example, if the adjusted speed is lower than the initial speed, the second threshold speed may be greater than the adjusted speed and less than or equal to the initial speed. By way of further example, if the adjusted speed is in the opposite direction of the initial speed, the second threshold speed may be in the direction of the adjusted speed and slower than the adjusted speed, or in the direction of the initial speed and slower than or equal to the initial speed.

As previously discussed, resetting the ground engaging tools (e.g., positioning the ground engaging tools in the working state and/or substantially removing soil/residue from the ground engaging tools) enhances the ground engaging tool performance, thereby increasing the effectiveness of tilling operations. Furthermore, because the ground engaging tool resetting procedure is performed by the implement control system in response to detection of reduced ground engaging tool performance, performance of the agricultural implement may be restored more quickly than manually inspecting and cleaning the ground engaging tools at service intervals. In addition, the duration associated with resetting the ground engaging tools may be substantially reduced (e.g., as compared to manually inspecting and cleaning the ground engaging tools at service intervals).

In certain embodiments, the agricultural implement controller 52 may attempt to move a ground engaging tool from the deflected state to the working state before initiating the ground engaging tool resetting process. For example, in certain embodiments, an actuator may be coupled to each tillage point assembly. In such embodiments, the agricultural implement controller may output a signal to the tillage point assembly actuator indicative of instructions to move the tillage point assembly from the deflected state to the working state in response to determining that the performance of the tillage point assembly is below the threshold performance (e.g., the tillage point assembly is in the deflected state). If the performance of the tillage point assembly remains below the threshold performance (e.g., because the actuator is unable to move the tillage point assembly from the deflected state to the working state), the agricultural implement controller may initiate the ground engaging tool resetting process described above.

In the illustrated embodiment, the work vehicle control system 44 includes a user interface 78 communicatively coupled to the controller 62. The user interface 78 is configured to provide input to the controller 62 and to receive output from the controller 62. As illustrated, the user interface 78 includes a display 80. The display 80 is configured to present information to an operator, such as the performance of the ground engaging tools. In certain embodiments, the display 80 may be a touch screen display configured to receive input from the operator. The user interface 78 may also include other input devices (e.g., keyboard, mouse, switches, buttons, etc.) configured to receive input from the operator.

In certain embodiments, the agricultural implement controller 52 is configured to output a signal (e.g., eighth signal) to the user interface 78 indicative of the performance of the ground engaging tool(s). For example, the agricultural implement controller 52 may output the signal (e.g., eighth signal) to the user interface 78 indicative of the performance of the ground engaging tool(s) being below the threshold performance in response to determining that the performance of the ground engaging tool(s) (e.g., the performance of at least one ground engaging tool) is below the threshold performance. By way of example, in response to determining the performance of the ground engaging tool(s) (e.g., based on feedback from the seedbed sensor 46 and/or the position sensors 48), the agricultural implement controller 52 may output a signal to the work vehicle controller 62 indicative of the performance (e.g., via the agricultural implement interface 58 and the work vehicle interface 60). The work vehicle controller 62, in turn, may output a signal indicative of the performance to the user interface 78. In response to receiving the signal, the user interface 78 may present information to the operator indicative of the ground engaging tool performance (e.g., via the display 80). For example, the display 80 may present a visual representation of each ground engaging tool and an indication of the performance (e.g., a color indicating whether the performance of the ground engaging tool is above or below the threshold performance, a numerical value indicating the performance of the ground engaging tool, a visual representation, such as a graph, of the performance of the ground engaging tool, a numeric counter indicating the number of times the performance of the ground engaging tool drops below the threshold performance, etc.).

In certain embodiments, the agricultural implement controller 52 may only output the signal to the user interface 78 indicative of the performance of the ground engaging tool(s) (e.g., being below the threshold performance) while the ground engaging tools are engaged with the soil. For example, the agricultural implement controller may only output the signal indicative of the performance of the ground engaging tool(s) (e.g., being below the threshold performance) after the ground engaging tool resetting process is complete and the ground engaging tool(s) have returned to the initial penetration depth(s). As a result, the operator is informed when the ground engaging tool resetting process is not successful. In response, the operator may perform a manual resetting process (e.g., clean the ground engaging tool(s), move the ground engaging tool(s) to the working state, etc.) at a suitable time (e.g., at the end of a row, after completion of the tilling operation, etc.).

Furthermore, in certain embodiments, the agricultural implement controller 52 may output the signal to the user interface 78 indicative of the performance of the ground engaging tool(s) (e.g., being below the threshold performance) while the position of the ground engaging tools is substantially equal to the target raised position (e.g., above the soil surface). For example, with regard to the tillage point assemblies, if the upward movement, and in certain embodiments the agitation, of the tillage point assemblies does not cause at least one tillage point assembly to move from the deflected state to the working state, the agricultural implement controller 52 may output the signal to the user interface 78 indicative of the performance of the ground engaging tool(s) being below the threshold performance before outputting the signal inductive of instructions to lower the ground engaging tools. In certain embodiments, the agricultural implement controller 52 may not output the signal indicative of instructions to lower the ground engaging tools until/unless the operator provides input to the user interface indicative of authorization to lower the tools. For example, upon receiving an indication from the user interface that the performance of at least one ground engaging tool is below the threshold performance, an operator may manually stop the agricultural system and manually reset the ground engaging tool(s) before authorizing the agricultural implement controller to output the signal indicative of instructions to lower the ground engaging tools (e.g., the agricultural implement controller may output a signal indicative of instructions to adjust the speed of the agricultural system to the initial speed before outputting the signal indicative of instructions to lower the ground engaging tools).

In certain embodiments, the operator may manually initiate the ground engaging tool resetting process by providing input to the user interface 78. In certain embodiments, the ground engaging tool resetting process may only be initiated in response to operator input. For example, in response to determining that the performance of one or more ground engaging tools is below the threshold performance, the agricultural implement controller 52 may instruct the user interface 78 (e.g., via the interfaces and the work vehicle controller 62) to present an indication of the performance on the display 80. The operator, in turn, may initiate the ground engaging tool resetting process by providing input to the user interface 78. Accordingly, in certain embodiments, the ground engaging tool resetting process may only be initiated in response to operator input and the performance of at least one ground engaging tool being below the threshold performance. In further embodiments, the agricultural implement controller may enable the operator to manually initiate the ground engaging tool resetting process even when the performance of the ground engaging tool(s) is not below the threshold performance.

Furthermore, in certain embodiments, the agricultural implement controller 52 may automatically initiate the ground engaging tool resetting process without operator input in response to determining that the performance of the ground engaging tool(s) (e.g., at least one ground engaging tool) is below the threshold performance. For example, in certain embodiments, the work vehicle 12 may be an autonomous or semi-autonomous work vehicle configured to perform agricultural (e.g., tilling, etc.) operations without operator input or with limited operator input. In such embodiments, the work vehicle controller 62 may direct the agricultural system 10 through a field along a route by providing input to the steering control system 66 and the speed control system 68. The route may be part of a plan associated with performing the agricultural (e.g., tilling, etc.) operation within the field (e.g., the plan may include routes for multiple agricultural systems within the field). The agricultural implement controller 52 may automatically initiate the ground engaging tool resetting process in response to determining that the performance of the ground engaging tool(s) is below the threshold performance (e.g., by providing instructions to the actuator(s) of the agricultural implement control system and the work vehicle controller). Furthermore, in certain embodiments, the work vehicle controller 62 may determine the portion of the field (e.g., along the route) having reduced tillage effectiveness due to the performance of one or more ground engaging tools being below the threshold performance and/or due to the ground engaging tool resetting process (e.g., if the ground engaging tool resetting process is performed along the route). The work vehicle controller 62 or a base station controller may adjust the plan to facilitate tilling/re-tilling the region in which the performance of the one or more ground engaging tools was below the threshold performance and/or that was bypassed due to the ground engaging tool resetting process. For example, the adjusted plan may include a route that directs the agricultural implement system along all or part of the performance limited/bypassed region (e.g., after completion of a current swath), or the adjusted plan may include a route of another agricultural system that directs the other agricultural system along the performance limited/bypassed region.

In certain embodiments, the agricultural implement controller may automatically initiate the ground engaging tool resetting process in response to determining that the performance of a single ground engaging tool is below the threshold performance. However, in other embodiments, the agricultural implement controller may only automatically initiate the ground engaging tool resetting process in response to determining that a threshold number of ground engaging tools are below the threshold performance. For example, the threshold number may be 1, 2, 3, 4, 5, 6, 7, 8, or any other suitable number. By way of further example, the threshold number may correspond to a percentage of the total number of ground engaging tools on the implement (e.g., 1 percent, 2 percent, 5 percent, 10 percent, etc.). In certain embodiments, the operator may manually initiate the ground engaging tool resetting process even if the threshold number of ground engaging tools are not below the threshold performance. For example, if the threshold number is five ground engaging tools, and the user interface indicates that the performance of four ground engaging tools is below the threshold performance, the operator may manually initiate the ground engaging tool resetting process based on feedback from the user interface.

In certain embodiments, the agricultural implement controller 52 may control the ground engaging tool resetting process based on input from the operator (e.g., via the user interface 78). For example, the operator may input the adjusted speed, the first threshold speed, the second threshold speed, the threshold performance, parameters associated with agitation of the ground engaging tools, or a combination thereof, into the user interface 78. The parameters associated with agitation of the ground engaging tools may include which actuators to control (e.g., any combination of the frame actuator 24, the wing actuator 72, the gang actuator 76, and the finishing reel actuator 50), the oscillation frequency, the oscillation magnitude, the duration of agitation, other suitable agitation parameters, or a combination thereof. Furthermore, in certain embodiments, the agricultural implement controller 52 may determine the adjusted speed, the first threshold speed, the second threshold speed, the threshold performance, the parameters associated with agitation of the ground engaging tools, or a combination thereof (e.g., based on the effectiveness of these values during previous resetting processes).

In certain embodiments, the agricultural implement controller 52 is configured to store a position/location of the agricultural implement in response to determining that the performance of the ground engaging tool(s) is below the threshold performance. In the illustrated embodiment, the work vehicle control system includes a spatial locating device 82 communicatively coupled to the work vehicle controller 62. The spatial locating device 82 is configured to output a signal indicative of a position, and in certain embodiments a velocity, of the work vehicle 12. The spatial locating device 82 may include any suitable system configured to measure and/or facilitate determination of the position of the work vehicle 12, such as a GPS receiver, for example. The spatial locating device 82 may output the signal indicative of the position/velocity of the work vehicle 12 to the agricultural implement controller 52 (e.g., via the work vehicle controller 62, the work vehicle interface 60, and the agricultural implement interface 58). In response to determining that the performance of one or more ground engaging tools is below the threshold performance, the agricultural implement controller 52 may determine the position/location of the agricultural implement 14 based on feedback from the spatial locating device 82, and the agricultural implement controller 52 may store the position/location of the agricultural implement (e.g., within the memory 56). For example, the agricultural implement controller 52 may store the position/location at which the performance of each ground engaging tool drops below the threshold performance on a map (e.g., yield map, prescription map, etc.) of the field, thereby enabling the operator or an automated system (e.g. including the agricultural implement controller 52) to determine the location of obstruction(s) (e.g., an obstruction sufficient to cause the performance of a ground engaging tool to drop below the threshold performance) within the field. While the spatial locating device is coupled to the work vehicle 12 in the illustrated embodiment, in other embodiments, the spatial locating device may be coupled to the agricultural implement.

While the ground engaging tool resetting process described above is controlled by the agricultural implement controller 52 in the illustrated embodiment, in other embodiments, the ground engaging tool resetting process may be controlled by the work vehicle controller 62 or a combination of the work vehicle controller 62 and the agricultural implement controller 52. In such embodiments, the agricultural implement control system may include the work vehicle controller. Furthermore, in certain embodiments, the agricultural implement may be self-propelled. In such embodiments, the elements communicatively coupled to the work vehicle controller (e.g., the steering control system, the speed control system, the spatial locating device, and the user interface) may be communicatively coupled to the agricultural implement controller (e.g., and the interfaces may be omitted). In such embodiments, the agricultural implement controller may control the speed of agricultural implement via the speed control system, and the agricultural implement controller may provide output to and receive input from the user interface. In addition, in certain embodiments, the user interface may be positioned remote from the work vehicle (e.g., in embodiments in which the agricultural system is controlled by a remote operator).

Furthermore, the target depth and/or the target raised position may be particularly selected based on the type of ground engaging tool. For example, the target depth and/or the target raised position of the disc blades may be different than the target depth and/or the target raised position of the finishing reels. In addition, in certain embodiments, ground engaging tools of the same type may have different target depths and/or target raised positions. For example, the target depth and/or the target raised position of a tillage point of a first tillage point assembly may be different than the target depth and/or the target raised position of a tillage point of a second tillage point assembly.

Figure 3:
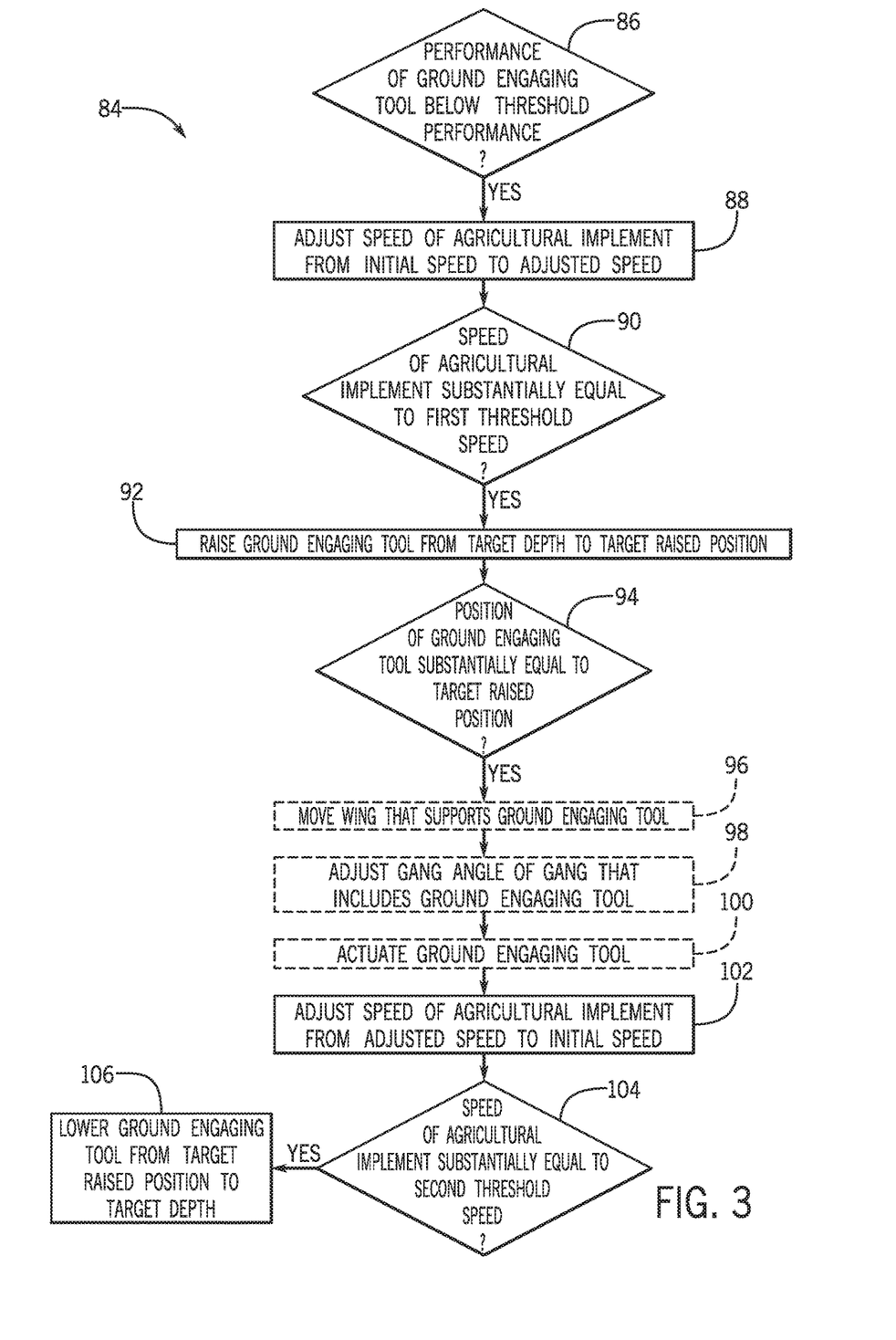
FIG. 3 is a flow diagram of an embodiment of a method for resetting a ground engaging tool of an agricultural implement.

FIG. 3 is a flow diagram of an embodiment of a method 84 for resetting a ground engaging tool of an agricultural implement. First, as represented by block 86, a determination is made regarding with performance of the ground engaging tool is below a threshold performance. As previously discussed, the performance of the ground engaging tool may be determined based on feedback from a seedbed sensor and/or a ground engaging tool position sensor. In response to determining that the performance of the ground engaging tool is below the threshold performance, the speed of the agricultural implement may be adjusted from the initial speed to an adjusted speed, as represented by block 88. For example, the adjusted speed may be lower than the initial speed, or the adjusted speed may be in an opposite direction of the initial speed. As represented by block 90, a determination is made regarding whether the speed of the agricultural implement is substantially equal to a first threshold speed. As previously discussed, the first threshold speed is between the initial speed and the adjusted speed, exclusive of the initial speed and inclusive of the adjusted speed. In response to determining that the speed of the agricultural implement is substantially equal to the first threshold speed, the ground engaging tool may be raised from the target depth to a target raised position. As previously discussed, upward movement of the ground engaging tool relative to the soil surface may dislodge soil/residue accumulation, and/or the upward movement may drive the ground engaging tool from a deflected state to a working state.

Next, as represented by block 94, a determination is made regarding whether the position of the ground engaging tool is substantially equal to the target raised position. In certain embodiments, in response to determining that the position of the ground engaging tool is substantially equal to the target raised position, a wing that supports the ground engaging tool may be moved, as represented by block 96. For example, the wing may be rocked in an upward/downward pattern, thereby agitating the ground engaging tool. Furthermore, in certain embodiments, in response to determining that the position of the ground engaging tool is substantially equal to the target raised position, a gang angle of a gang that includes the ground engaging tool may be adjusted, as represented by block 98. For example, the gang may be shaken in a forward/rearward pattern, thereby agitating the ground engaging tool. In addition, in certain embodiments, in response to determining that the position of the ground engaging tool is substantially equal to the target raised position, the ground engaging tool may be actuated, as represented by block 100. For example, the ground engaging tool may be shaken in an upward/downward pattern, thereby agitating the ground engaging tool. The agitation may dislodge soil/residue accumulation on the ground engaging tool. In addition, the agitation may enable a spring coupled to the ground engaging tool to drive the ground engaging tool from the deflected state to the working state.

Furthermore, in response to determining that the position of the ground engaging tool is substantially equal to the target raised position, the speed of the agricultural implement may be adjusted from the adjusted speed to the initial speed, as represented by block 102. Next, as represented by block 104, a determination is made regarding whether the speed of the agricultural implement is substantially equal to a second threshold speed. As previously discussed, the second threshold speed is between the adjusted speed and the initial speed, exclusive of the adjusted speed and inclusive of the initial speed. In response to determining that the speed of the agricultural implement is substantially equal to the second threshold speed, the ground engaging tool may be lowered from the target raised position to the target depth (e.g., such that the penetration depth of the ground engaging tool is substantially equal to the penetration depth before the step associated with block 92 is performed), as represented by block 106. As previously discussed, resetting the ground engaging tool (e.g., positioning the ground engaging tool in the working state and/or removing soil/residue from the ground engaging tool) enhances the ground engaging tool performance, thereby increasing the effectiveness of tilling operations.

The steps of the method 84 may be performed in the order disclosed herein or in any suitable order. In addition, the method 84 may be performed by the controller of the agricultural implement, the controller of the work vehicle, another suitable controller, or any combination thereof.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for an agricultural implement, comprising:
 a controller comprising a memory and a processor, wherein the controller is configured to determine whether performance of a ground engaging tool of the agricultural implement is below a threshold performance, and the controller, in response to determining that the performance of the ground engaging tool is below the threshold performance, is configured to:
  output a first signal indicative of instructions to adjust a speed of the agricultural implement from an initial speed to an adjusted speed;
  output a second signal indicative of instructions to raise the ground engaging tool from a target depth beneath a soil surface to a target raised position in response to the speed of the agricultural implement being substantially equal to a first threshold speed, wherein the first threshold speed is between the initial speed and the adjusted speed, exclusive of the initial speed and inclusive of the adjusted speed;
  output a third signal indicative of instructions to adjust the speed of the agricultural implement from the adjusted speed to the initial speed in response to a position of the ground engaging tool being substantially equal to the target raised position; and
  output a fourth signal indicative of instructions to lower the ground engaging tool from the target raised position to the target depth in response to the speed of the agricultural implement being substantially equal to a second threshold speed, wherein the second threshold speed is between the adjusted speed and the initial speed, exclusive of the adjusted speed and inclusive of the initial speed.

2. The control system of claim 1, wherein the controller is configured to determine whether the performance of the ground engaging tool is below the threshold performance based on feedback from a seedbed sensor.

3. The control system of claim 1, wherein the controller is configured to determine whether the performance of the ground engaging tool is below the threshold performance based on feedback from a ground engaging tool position sensor.

4. The control system of claim 1, wherein the controller is configured to output a fifth signal indicative of instructions to move a wing that supports the ground engaging tool in response to the position of the ground engaging tool being substantially equal to the target raised position.

5. The control system of claim 1, wherein the controller is configured to output a sixth signal indicative of instructions to adjust a gang angle of a gang that includes the ground engaging tool in response to the position of the ground engaging tool being substantially equal to the target raised position.

6. The control system of claim 1, wherein the controller is configured to output a seventh signal indicative of instructions to actuate the ground engaging tool in response to the position of the ground engaging tool being substantially equal to the target raised position.

7. The control system of claim 1, wherein the controller is configured to output an eighth signal to a user interface indicative of the performance of the ground engaging tool being below the threshold performance in response to the position of the ground engaging tool being substantially equal to the target depth and the performance of the ground engaging tool being below the threshold performance.

8. The control system of claim 1, wherein the controller is configured to output the first signal in response to determining that the performance of the ground engaging tool is below the threshold performance and receiving a ninth signal from a user interface indicative of resetting the ground engaging tool.

9. The control system of claim 1, wherein the adjusted speed is lower than the initial speed, or the adjusted speed is in an opposite direction of the initial speed.

10. The control system of claim 1, wherein the controller is configured to store a location of the agricultural implement in response to determining that the performance of the ground engaging tool is below the threshold performance.

11. A control system for an agricultural implement, comprising:
 a frame actuator configured to control a height of a frame of the agricultural implement relative to a soil surface;
 a sensor configured to output a sensor signal indicative of performance of a ground engaging tool coupled to the frame of the agricultural implement; and
 a controller communicatively coupled to the frame actuator and the sensor, wherein the controller comprises a memory and a processor, the controller is configured to receive the sensor signal from the sensor indicative of the performance of the ground engaging tool, the controller is configured to determine whether the performance of the ground engaging tool is below a threshold performance, and the controller, in response to determining that the performance of the ground engaging tool is below the threshold performance, is configured to:
  output a first signal indicative of instructions to adjust a speed of the agricultural implement from an initial speed to an adjusted speed;
  output a second signal to the frame actuator indicative of instructions to raise the ground engaging tool from a target depth beneath the soil surface to a target raised position in response to the speed of the agricultural implement being substantially equal to a first threshold speed, wherein the first threshold speed is between the initial speed and the adjusted speed, exclusive of the initial speed and inclusive of the adjusted speed;
  output a third signal indicative of instructions to adjust the speed of the agricultural implement from the adjusted speed to the initial speed in response to a position the ground engaging tool being substantially equal to the target raised position; and output a fourth signal to the frame actuator indicative of instructions to lower the ground engaging tool from the target raised position to the target depth in response to the speed of the agricultural implement being substantially equal to a second threshold speed, wherein the second threshold speed is between the adjusted speed and the initial speed, exclusive of the adjusted speed and inclusive of the initial speed.

12. The control system of claim 11, wherein the sensor comprises a seedbed sensor configured to output the sensor signal indicative of a condition of soil surface.

13. The control system of claim 11, wherein the sensor comprises a ground engaging tool position sensor configured to output the sensor signal indicative of the position of the ground engaging tool.

14. The control system of claim 11, comprising a wing actuator configured to control a state of a wing that supports the ground engaging tool, wherein the controller is configured to output a fifth signal to the wing actuator indicative of instructions to move the wing in response to the position of the ground engaging tool being substantially equal to the target raised position.

15. The control system of claim 11, comprising a gang actuator configured to control an angle of a gang that includes the ground engaging tool, wherein the controller is configured to output a sixth signal to the gang actuator indicative of instructions to adjust the gang angle in response to the position of the ground engaging tool being substantially equal to the target raised position.

16. A method for controlling an agricultural system, comprising:

determining, via a controller, whether performance of a ground engaging tool of an agricultural implement of the agricultural system is below a threshold performance;

outputting, via the controller, a first signal indicative of instructions to adjust a speed of the agricultural system from an initial speed to an adjusted speed in response to determining that the performance of the ground engaging tool is below the threshold performance;

outputting, via the controller, a second signal indicative of instructions to raise the ground engaging tool from a target depth beneath a soil surface to a target raised position in response to the speed of the agricultural system being substantially equal to a first threshold speed, wherein the first threshold speed is between the initial speed and the adjusted speed, exclusive of the initial speed and inclusive of the adjusted speed;

outputting, via the controller, a third signal indicative of instructions to adjust the speed of the agricultural system from the adjusted speed to the initial speed in response to a position of the ground engaging tool being substantially equal to the target raised position; and outputting, via the controller, a fourth signal indicative of instructions to lower the ground engaging tool from the target raised position to the target depth in response to the speed of the agricultural system being substantially equal to a second threshold speed, wherein the second threshold speed is between the adjusted speed and the initial speed, exclusive of the adjusted speed and inclusive of the initial speed.

17. The method of claim 16, comprising outputting, via the controller, a fifth signal indicative of instructions to move a wing that supports the ground engaging tool in response to the position of the ground engaging tool being substantially equal to the target raised position.

18. The method of claim 16, comprising outputting, via the controller, a sixth signal indicative of instructions to adjust a gang angle of a gang that includes the ground engaging tool in response to the position of the ground engaging tool being substantially equal to the target raised position.

19. The method of claim 16, comprising outputting, via the controller, a seventh signal indicative of instructions to actuate the ground engaging tool in response to the position of the ground engaging tool being substantially equal to the target raised position.

20. The method of claim 16, wherein the adjusted speed is lower than the initial speed, or the adjusted speed is in an opposite direction of the initial speed.

* * * * *